(12) United States Patent
Kim et al.

(10) Patent No.: US 6,369,173 B1
(45) Date of Patent: Apr. 9, 2002

(54) PROCESS FOR PREPARING SYNDIOTACTIC STYRENIC POLYMERS BY RECYCLING THE PRODUCTS

(75) Inventors: Hyun-Joon Kim; Jae-Gon Lim, both of Taejeon; Sung-Cheol Yoon, Seoul, all of (KR)

(73) Assignee: Samsung General Chemicals Co., Ltd. (KR)

( * ) Notice: Subject to any disclaimer, the term of this patent is extended or adjusted under 35 U.S.C. 154(b) by 0 days.

(21) Appl. No.: 09/663,444

(22) Filed: Sep. 15, 2000

(30) Foreign Application Priority Data

Feb. 2, 2000 (KR) .............................. 00-5069

(51) Int. Cl.7 .............................. C08F 2/36; C08F 12/02
(52) U.S. Cl. .............................. 526/67; 526/65; 526/88; 526/124.1; 526/130; 526/156; 526/274; 526/279; 526/284; 526/287; 526/293; 526/336; 526/346; 526/347
(58) Field of Search .............................. 526/65, 67, 68, 526/88, 346, 336, 124.1, 130, 156, 274, 279, 284, 293, 287, 347

(56) References Cited

U.S. PATENT DOCUMENTS

| | | | |
|---|---|---|---|
| 4,544,762 A | 10/1985 | Kaminsky et al. | 556/179 |
| 5,026,798 A | 6/1991 | Canich | 526/127 |
| 5,037,907 A | 8/1991 | Imabayashi et al. | 526/88 |
| 5,254,647 A | 10/1993 | Yamamoto et al. | 526/88 |
| 5,484,862 A | 1/1996 | Siddall et al. | 526/88 |
| 5,942,589 A * | 8/1999 | Wunsch et al. | 526/346 |
| 6,242,542 B1 * | 6/2001 | Beaudoin | 526/346 X |
| 6,245,865 B1 * | 6/2001 | Lee et al. | 526/65 |

FOREIGN PATENT DOCUMENTS

| | | |
|---|---|---|
| EP | 0 210 615 | 7/1996 |
| JP | 62-104818 | 5/1987 |
| JP | 62-187708 | 8/1987 |
| JP | 63-191811 | 8/1988 |
| JP | 3-250007 | 11/1991 |
| JP | 3-258812 | 11/1991 |
| JP | 4-275313 | 9/1992 |
| JP | 5-105712 | 4/1993 |
| WO | WO99/10394 | 3/1999 |

OTHER PUBLICATIONS

U.S. application No. 08/844,109, Kim et al., filed Apr. 28, 1997.
U.S. application No. 08/844,110, Kim et al., filed Apr. 28, 1997.

* cited by examiner

Primary Examiner—Fred Teskin
(74) Attorney, Agent, or Firm—Woodcock Washburn LLP

(57) ABSTRACT

The present invention relates to a process of preparing syndiotactic styrenic polymers with a high conversion rate in the form of fine powder, which comprises (a) preparing styrenic polymers in a solid state by reacting a mixture consisting of styrenic monomers, a metallocene catalyst, a cocatalyst and inert organic solvent in a polymerization reactor, (b) separating a portion of the styrenic polymers from the reactor, (c) recycling the portion of the styrenic polymers in the reactor, and (d) reacting the recycled styrenic polymers with styrenic monomers. The styrenic monomers may include olefinic monomers. The monomers can be introduced to a single inlet or multiple inlets of the reactor. A single reactor or a plural number of reactors can be operated in the present invention. The plural numbers of reactors are arranged in series or in parallel. In the present invention, a self-cleaning mono- or twin-axis reactor can be employed to prevent the polymers from agglomerating on the inner wall or the axis. Alternatively, a cylindrical reactor can be employed, where the styrenic polymers are transported in a solid or powder state rotating in a certain direction at the range of Froude Number of from 0.1 to 10 and polymerization proceeds toward the exit of the reactor.

22 Claims, 8 Drawing Sheets

PROCESS FOR PREPARING SYNDIOTACTIC STYRENIC POLYMERS BY RECYCLING THE PRODUCTS

FIELD OF THE INVENTION

The present invention relates to a polymerization process for preparing syndiotactic polystyrenes without forming agglomeration of the polymers on the inner wall or top wall of the reactor. More particularly, the present invention relates to a polymerization process for preparing syndiotactic polystyrenes in the form of powder of fine particles, which comprises polymerizing styrenic monomers in a batch reactor or in a continuous reactor, recycling a portion of the polystyrene in the reactor and reacting the recycled polystyrene with styrenic monomers, which does not cause agglomeration of the polystyrene on the inner wall or top wall of the reactor.

BACKGROUND OF THE INVENTION

In general, polystyrenes are classified into an atactic, an isotactic and a syndiotactic structure depending on the position of benzene rings as side chains. An atactic polystyrene has an irregular arrangement of the benzene rings and an isotactic polystyrene has an arrangement that the benzene rings are positioned at one side of the polymer main chain. On the other hand, a syndiotactic polystyrene has a regularly alternating arrangement of the benzene rings.

Metallocene catalysts are used for preparing the syndiotactic polystyrenes. The metallocene catalysts have a bridged structure of a complex of Group IV transition metals such as Ti, Zr, Hf etc. in the Periodic Table and a ligand having one or two cycloalkane dienyl groups such as cyclopentadienyl group, indenyl groups, fluorenyl group, and derivatives thereof. As the metallocene catalysts have high activities, the catalysts can prepare polymers having better physical properties than the Ziegler-Natta catalysts.

A metallocene catalyst is used with a cocatalyst for preparation of the syndiotactic polystyrene. A representative example of the cocatalyst is alkyl aluminoxane which is prepared by reacting water with an alkyl aluminum compound. Such catalyst system can prepare polystyrene having a high syndiotactic stereoregularity and a high molecular weight.

European Patent Publication No. 210 615 A2 (1987) discloses a syndiotactic polystyrene with a good stereoregularity which is prepared by using a catalyst of cyclopentadienyl titanium trichloride or alkylated cyclopentadienyl titanium such as pentamethyl cyclopentadienyl titanium trichloride. Such catalysts are known to have preferable catalyst activity, molecular weight, and syndiotactic index.

Japanese Patent Publication Nos. 63-191811 and 3-250007 disclose sulfur bridged metallocene catalysts which have a low yield of manufacture. Also, Japanese Patent Publication Nos. 3-258812, 4-275313 and 5-105712 disclose alkyl bridged metallocene catalysts which have too low yield of manufacture to commercialize.

U.S. Pat. No. 4,544,762 teaches a process for polymerizing alpha-olefins or styrenes with a high activity and a high stereoregularity using a catalyst system consisting of a transition metal catalyst and a reaction product of alkyl aluminum and metal hydroxide. The catalyst system can prepare polyolefins or polystyrenes with a higher activity and a higher stereoregularity than the Ziegler-Natta catalyst.

Japanese Patent Publication Nos. 62-104818 and 62-187708 disclose metallocene catalysts for preparing polystyrene having a syndiotactic structure. The metallocene catalysts have a transition metal of Group IVB of the Periodic Table and a cyclopentadienyl derivative as ligand. With the catalysts, alkyl aluminoxane is used as cocatalyst, which is a reaction product of an alkyl aluminum with a metal hydroxide.

U.S. Pat. No. 5,026,798 teaches a catalytic process using a Group IVB transition metal component and an aluminoxane component to polymerize alpha-olefins to produce high crystallinity and high molecular weight poly-alpha-olefins.

U.S. patent Ser. Nos. 08/844109 and 08/844110 disclose a new alkyl-bridged binuclear metallocene catalyst, a silyl-bridged binuclear metallocene catalyst, and an alkyl-silyl-bridged binuclear metallocene catalyst to polymerize styrenes to produce polystyrene having high stereoregularity, high melting point, and good molecular weight distribution.

A batch process or a continuation process is adopted to prepare polystyrene having a syndiotactic structure. The processes employ a tank-type reactor equipped with agitating blades. U.S. Pat. No. 5,037,907 discloses a vertical tank-type reactor with an agitating blade. The process is called as solution polymerization because the monomers remain in a liquid phase during polymerization. However, in theoretical, although this process can prevent the polymer from agglomerating because the liquid media are dispersed on the surface of the polymer particles, this type reactor still causes a problem of a low monomer conversion rate such as 75% below which will result in deteriorating quality of the polymer.

U.S. Pat. No. 5,254,647 discloses a self-cleaning reactor which is capable of continuation process and is a twin screw reactive extruder type. The reactor can prevent agglomeration of polymer through mixing. The wiped surface reactor controls polymerization until about 10 to 20% of the polymer product is obtained in a powder state, and a continuation process is carried out in the powder bed reactor which is a vertical tank type. This reactor can prevent a rapid polymerization. However, it is not economical due to use of two reactors and it has a disadvantage for the wiped surface reactor to limit the process capacity of the system.

U.S. Pat. No. 5,484,862 discloses a liquid phase, powder bed polymerization process for preparing syndiotactic polymers from vinyl aromatic monomers comprising continuously introducing one or more vinyl aromatic monomers and one or more catalyst systems to a horizontally disposed, continuously agitated, cylindrically shaped reactor containing solid particles, and continuously removing polymerized product therefrom.

PCT Publication No. 99/10394 discloses a process to produce syndiotactic polymer, which comprises preparing a polymer-containing mixture by polymerizing a first aromatic vinyl monomer with a catalyst at the conversion rate of from 60 to 85% in a first reverse mixing reactor under polymerization condition, and introducing the polymer-containing mixture to a second or more reverse mixing reactors to contact a second aromatic vinyl monomer under polymerization condition.

However, when the conversion rate to polymer is 20% or more, the conventional processes produce large particles having a diameter of 5 mm or more, agglomeration bands by the unflowable products on the top of the reactor, and agglomeration bands at the clearance between the agitating blades and the inner wall of the reactor. The large particles and the agglomeration bands prevent from proceeding with polymerization due to containing monomers and catalysts therein, thereby lowering the production yield and the drying efficiency. Further, the agglomerated material cannot easily be removed because of strong adhesion and causes bad agitation during repolymerization without removing.

Accordingly, the present inventors have developed a process a polymerization process for preparing syndiotactic polystyrenes in the form of powder of fine particles, which comprises polymerizing styrenic monomers in a batch reactor or in a continuous reactor, recycling a portion of the polystyrene in the reactor and reacting the recycled polystyrene with styrenic monomers, which does not cause agglomeration of the polystyrene on the inner wall or top wall of the reactor. In this case of preparing syndiotactic styrenic polymers by adopting the product-recycling process according to the present invention, agglomeration on the inner wall which is one of disadvantages in the bulk polymerization process can be prevented, and styrenic polymers of fine powder with a high bulk density and a uniform particle size can be obtained.

OBJECTS OF THE INVENTION

A feature of the present invention is the provision of a process of preparing syndiotactic styrenic polymers with a high conversion rate in the form of fine powder in a reactor which is designed to proceed a powder polymerization gradually by agitating the solid and/or powder reactants in a certain direction and which is a self-cleaning type or a cylindrical type preventing agglomeration of the reactants and/or products on the inner wall or the agitating blades.

Another feature of the present invention is the provision of a process of preparing syndiotactic styrenic polymers in the form of fine powder, which comprises polymerizing styrenic monomers in a reactor, recycling a portion of the polystyrene in the reactor and reacting the recycled polystyrene with styrenic monomers, thereby improving the seed effect.

A further feature of the present invention is the provision of a process of preparing syndiotactic styrenic polymers with a high bulk density in the form of fine powder.

A further feature of the present invention is the provision of a process of preparing syndiotactic styrenic polymers with a high bulk density in the form of fine powder, the process being stable and lower energy consuming.

The above and other objects and advantages of this invention will be apparent from the ensuing disclosure and appended claims.

SUMMARY OF THE INVENTION

The present invention relates to a process of preparing syndiotactic styrenic polymers with a high conversion rate in the form of fine powder, which comprises (a) preparing styrenic polymers in a solid state by reacting a mixture consisting of styrenic monomers, a metallocene catalyst, a cocatalyst and inert organic solvent in a polymerization reactor, (b) separating a portion of the styrenic polymers from the reactor, (c) recycling the portion of the styrenic polymers in the reactor, and (d) reacting the recycled styrenic polymers with styrenic monomers.

The styrenic monomers may include olefinic monomers. The monomers can be introduced to a single inlet or multiple inlets of the reactor. A single reactor or a plural number of reactors can be operated in the present invention. The plural numbers of reactors are arranged in series or in parallel. In the present invention, a self-cleaning mono- or twin-axis reactor can be employed to prevent the polymers from agglomerating on the inner wall or the axis. Alternatively, a cylindrical reactor can be employed, where the styrenic polymers are transported in a solid or powder state rotating in a certain direction at the range of Froude Number of from 0.1 to 10 and polymerization proceeds toward the exit of the reactor.

DETAILED DESCRIPTION OF THE INVENTION

The present invention relates to a polymerization process for preparing syndiotactic polystyrenes in the form of powder of fine particles, which comprises polymerizing styrenic monomers in a batch reactor or in a continuous reactor, recycling a portion of the polystyrene in the reactor and reacting the recycled polystyrene with styrenic monomers, which does not cause agglomeration of the polystyrene on the inner wall or top wall of the reactor.

The styrenic monomers may include olefinic monomers. A single reactor or a plural number of reactors can be operated in the present invention. The reactor has a single inlet or multiple inlets for feeding the monomer mixture including catalysts and organic solvent. The plural numbers of reactors are arranged in series or in parallel. In the present invention, a self-cleaning mono- or twin-axis reactor can be employed to prevent the polymers from agglomerating on the inner wall or the axis. Alternatively, a cylindrical reactor can be employed, where the styrenic polymers are transported in a solid or powder state rotating in a certain direction at the range of Froude Number of from 0.1 to 10 and polymerization proceeds toward the exit of the reactor.

Polymerization Process

Figure 1:
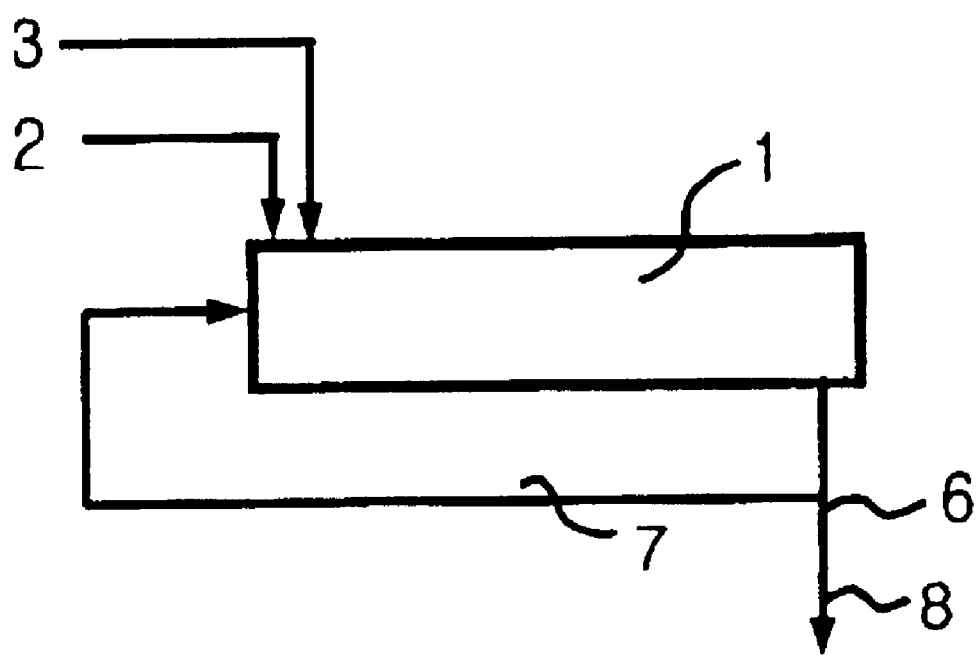
FIG. 1 is a schematic diagram of a single reactor system for preparing syndiotactic styrenic polymers by recycling a portion of the prepared polymers in accordance with the present invention.

FIG. 1 is a schematic diagram of a single reactor system for preparing syndiotactic styrenic polymers by recycling a portion of the prepared polymers in accordance with the present invention.

Starting materials 2 and 3 for preparation of syndiotactic styrenic polymers are introduced into the reactor 1 through an inlet equipped at the entrance part. The starting materials include monomers, a metallocene catalyst, a cocatalyst and inert organic solvent. The monomers may be styrenic monomers and a mixture of styrenic monomers and olefinic monomers. The starting materials can be introduced individually or mixed into the reactor. Before the monomers are introduced into the reactor, a certain amount of prepolymerized syndiotactic styrenic polymer may be introduced into the reactor. In other words, a certain amount of prepolymerized syndiotactic styrenic polymer may be introduced into the reactor and agitated, then the monomers may be added to the polymer for polymerization. Further, before the monomers are introduced into the reactor, the starting materials may be aged over 0.1 minute at a temperature of from about −80 to about 300° C., preferably over 1 to 60 minutes at a temperature of from about 0 to about 150° C.

Polymerized product 6 exits from the reactor 1. A certain amount 7 of the polymerized product is recycled to the reactor and the remaining portion 8 is collected. The recycled styrenic polymer is polymerized in the reactor with the monomers introduced thereto. The recycled styrenic polymer is in the form of fine particles. The fine particles of the styrenic polymers functions as seeds which will accelerate polymerization, thereby reducing fouling in the polymerization process, providing a high conversion rate, and producing syndiotactic styrenic polymers in the form of fine particles. When the conversion rate reaches to about 30%, the polymers are formed in a solid state, and further polymerization in the self-cleaning reactor or cylindrical reactor leads to a conversion rate of about 60% or more in a powder state. A certain amount of the powder state polymer is separated and recycled to the reactor and the remaining polymer unrecycled is collected. The collected polymer has a high bulk density and is prepared with a high productivity.

Figure 2:
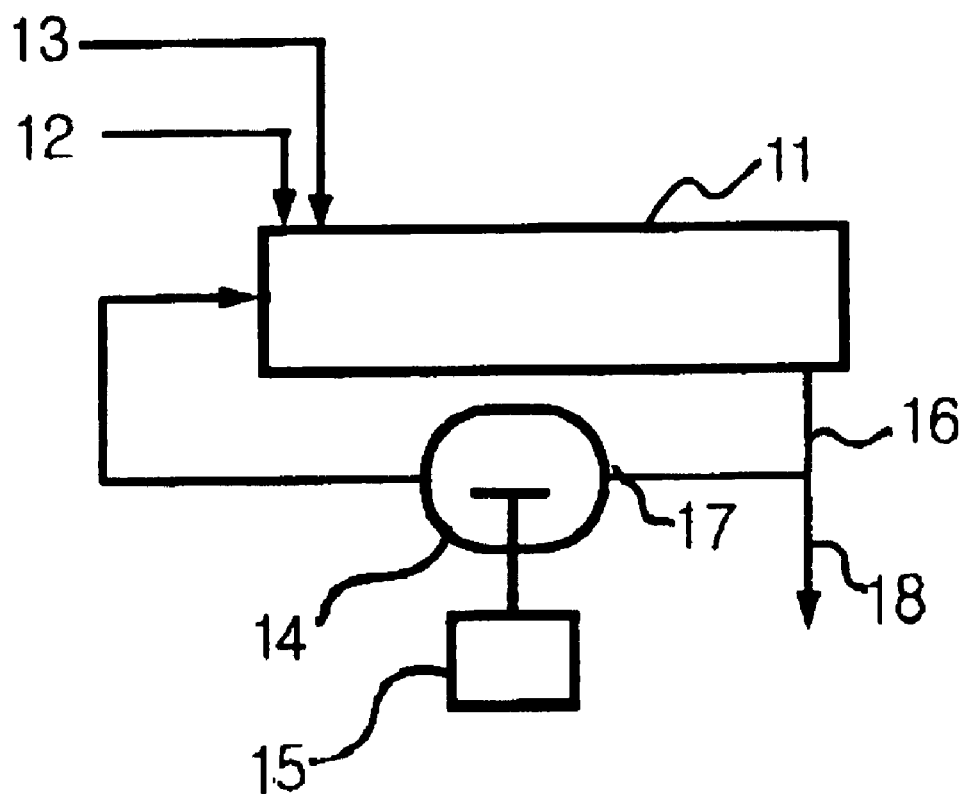
FIG. 2 is a schematic diagram of another single reactor system for preparing syndiotactic styrenic polymers by recycling a portion of the prepared polymers in accordance with the present invention.

In case that the separated polymer to be recycled is not in the form of fine particles, the polymer is pulverized before being recycled to the reactor. FIG. 2 is a schematic diagram of a single reactor system for pulverizing the separated polymer before being recycled. In FIG. 2, the separated polymer 17 is pulverized in the chopper 14 equipped with a high speed rotating means 15. The starting materials 12 and 13 are introduced to the reactor 11 and the unrecycled polymer 18 is collected. The chopper and the high speed rotating means can be easily understood by an ordinary skilled person in the art to which the invention pertains.

Figure 3:
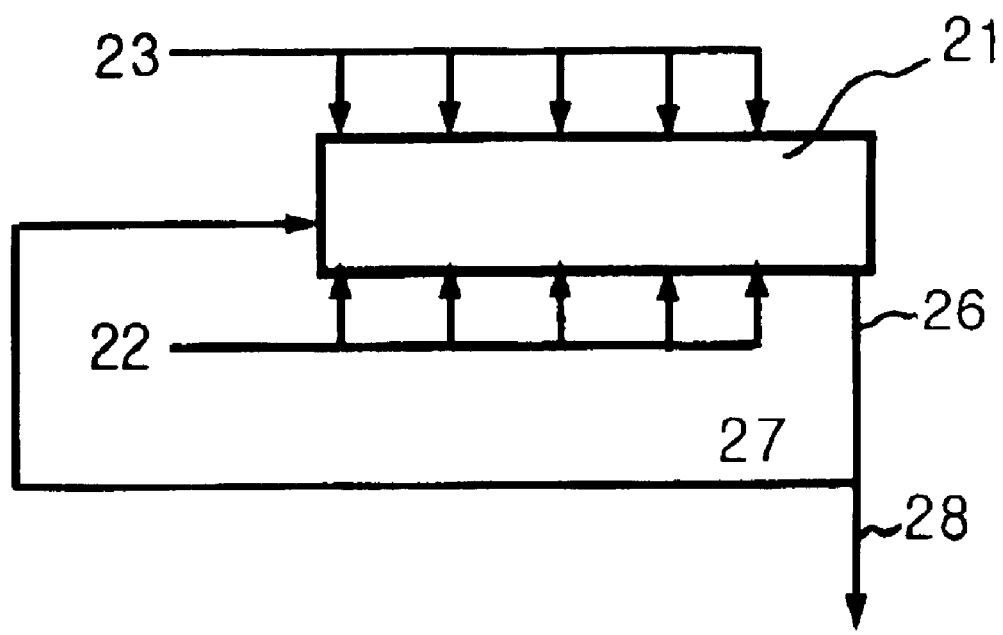
FIG. 3 is a schematic diagram of a single reactor system with multiple inlets for preparing syndiotactic styrenic polymers by recycling a portion of the prepared polymers in accordance with the present invention.

FIG. 3 is a schematic diagram of a single reactor system with multiple inlets for preparing syndiotactic styrenic polymers by recycling a portion of the prepared polymers in accordance with the present invention. The reactor is equipped with multiple inlets. The monomers or the starting materials 22 and 23 including monomers are introduced to the reactor 21 through the multiple inlets. The polymerized product 26 is discharged from the reactor 21. A certain amount 27 of the polymerized product is separated and recycled to the reactor and the remaining portion 28 is collected. Through the multiple inlets the monomers are introduced dividedly into the reactor. Such divided introduction of monomers can prevent agglomeration of the reactants and/or products in the inner wall of the reactor. If the separated polymer to be recycled is not in the form of fine particles, the polymer is pulverized before being recycled to the reactor.

Figure 4:
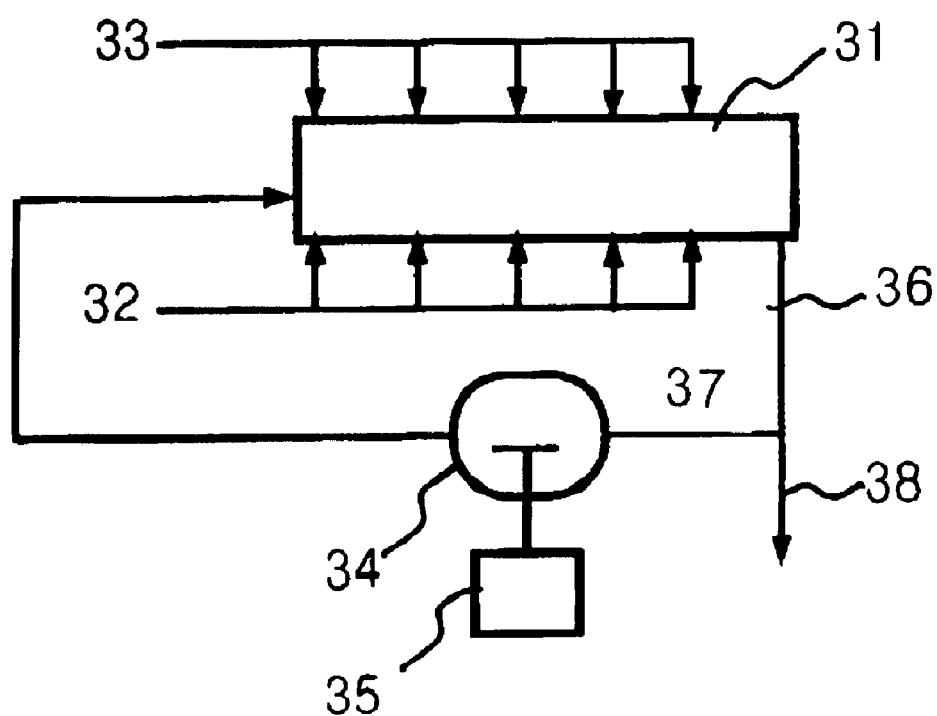
FIG. 4 is a schematic diagram of another single reactor system with multiple inlets for preparing syndiotactic styrenic polymers by recycling a portion of the prepared polymers in accordance with the present invention.

FIG. 4 is a schematic diagram of a single reactor system with multiple inlets for pulverizing the separated polymer. In FIG. 4, the starting materials 32 and 33 are introduced into the reactor 31, the product 36 is discharged from the reactor, the separated polymer 37 is pulverized in the chopper 34 equipped with a high speed rotating means 35. The starting materials 32 and 33 are introduced to the reactor and the unrecycled polymer 38 is collected.

Figure 5:
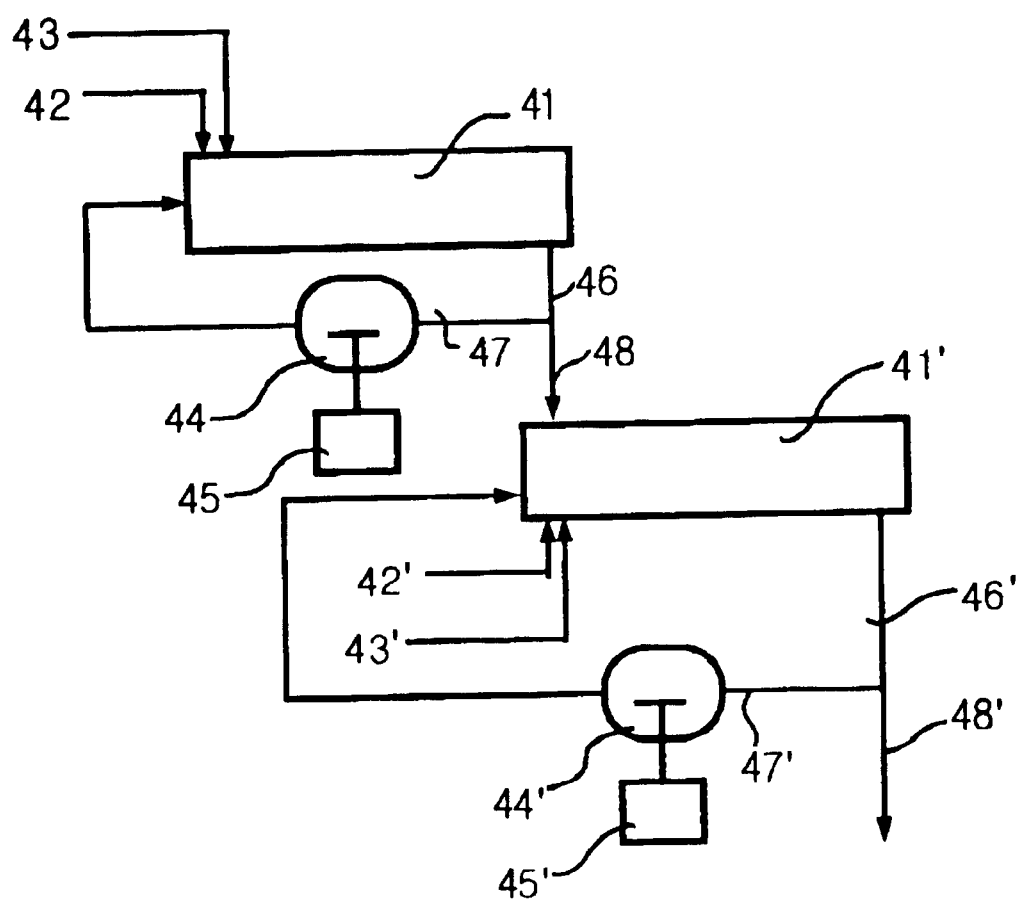
FIG. 5 is a schematic diagram of a two reactors system, of which reactors are connected in series, for preparing syndiotactic styrenic polymers by recycling a portion of the prepared polymers in accordance with the present invention.

In the present invention, a plural number of reactors can be connected in series. FIG. 5 is a schematic diagram of a two reactors system, of which reactors are connected in series, for preparing syndiotactic styrenic polymers by recycling a portion of the prepared polymers in accordance with the present invention. In FIG. 5, the system has two reactors that are connected in series, and each reactor carries out recycling of the polymer. The first starting materials 42 and 43 are introduced into the first reactor 41, the first product 46 exits from the reactor, the separated polymer 47 is pulverized in the chopper 44 equipped with a high speed rotating means 45. The unrecycled polymer 48 in the first reactor is introduced in to the second reactor 41'. The second starting materials 42' and 43' are introduced into the second reactor 41', the second product 46' is discharged from the reactor, the separated polymer 47' is pulverized in the chopper 44' equipped with a high speed rotating means 45'. The unrecycled polymer 48' in the second reactor is collected. In the first reactor, the conversion rate is preferably about 30% or more, because, if the conversion rate is less than 30%, the first product is discharged in the form of slurry not to be able to recycle the product. In the second reactor, the final product has preferably a conversion rate of about 60% or more. Of course, if the separated polymer to be recycled is in the form of fine powder in the first or second reactor, it is unnecessary to pulverize the polymer.

Figure 6:
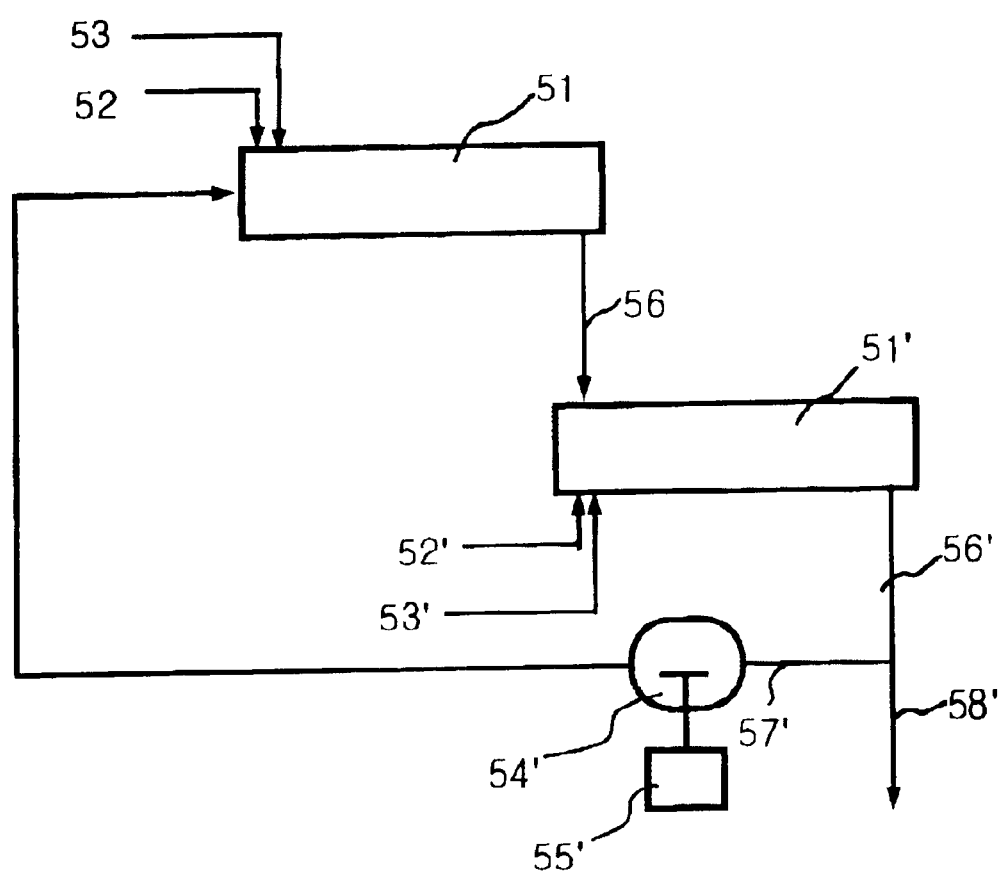
FIG. 6 is a schematic diagram of another two reactors system, of which reactors are connected in series, for preparing syndiotactic styrenic polymers by recycling a portion of the prepared polymers in accordance with the present invention.

FIG. 6 illustrates a schematic diagram of another two reactors system, of which reactors are connected in series, for preparing syndiotactic styrenic polymers in accordance with the present invention. In this embodiment, the separated polymer 57' from the second reactor 51' is recycled to the first reactor 51. The first starting materials 52 and 53 are introduced into the first reactor 51, the first product 56 is introduced in to the second reactor 51'. The second starting materials 52' and 53' are introduced into the second reactor 51', the second product 56' is discharged from the reactor, the separated polymer 57' to be recycled is pulverized in the chopper 54' equipped with a high speed rotating means 55' and recycled to the first reactor 51. The unrecycled polymer 58' in the second reactor is collected. In the first reactor of FIG. 6, the conversion rate is preferably about 30% or more, because, if the conversion rate is less than 30%, the first product exits in the form of slurry not to be able to recycle the product. In the second reactor, the final product has preferably a conversion rate of about 60% or more. Of course, if the separated polymer to be recycled is in the form of fine powder, it is unnecessary to pulverize the polymer.

Figure 7:
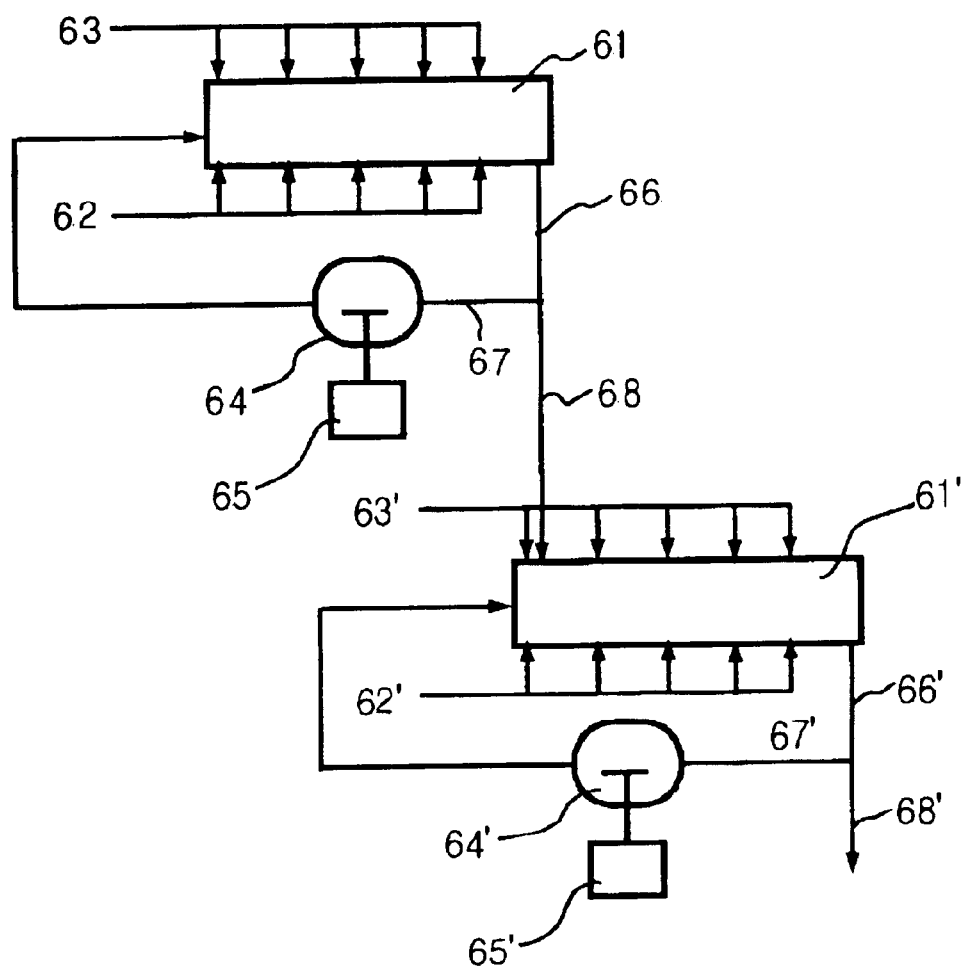
FIG. 7 is a schematic diagram of a two reactors system, of which reactors are connected in series and have multiple inlets, for preparing syndiotactic styrenic polymers by recycling a portion of the prepared polymers in accordance with the present invention.
Figure 8:
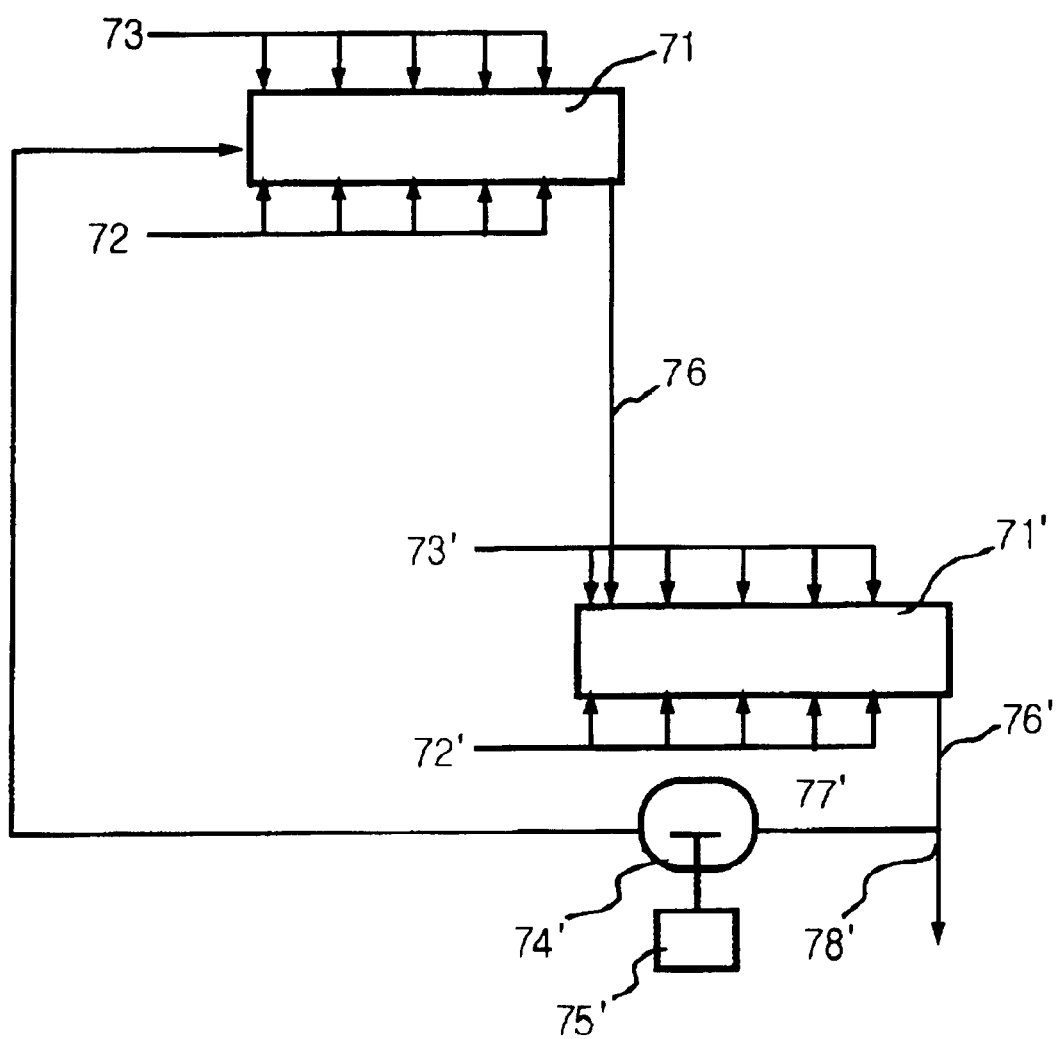
FIG. 8 is a schematic diagram of another two reactors system, of which reactors are connected in series and have multiple inlets, for preparing syndiotactic styrenic polymers by recycling a portion of the prepared polymers in accordance with the present invention.

FIG. 7 is a schematic diagram of a two reactors system, of which reactors are connected in series and have multiple inlets, and FIG. 8 is a schematic diagram of another two reactors system, of which reactors are connected in series and have multiple inlets.

As shown in FIG. 7, the monomers or the starting materials 62 and 63 including monomers are introduced to the reactor 61 through the multiple inlets. The first starting materials 62 and 63 are introduced into the first reactor 61, the first product 66 is discharged from the reactor, the separated polymer 67 is pulverized in the chopper 64 equipped with a high speed rotating means 65. The unrecycled polymer 68 in the first reactor is introduced in to the second reactor 61'. The second starting materials 62' and 63' are introduced into the second reactor 61', the second product 66' exits from the reactor, the separated polymer 67' is pulverized in the chopper 64' equipped with a high speed rotating means 65'. The unrecycled polymer 68' in the second reactor is collected.

As shown in FIG. 8, the first starting materials 72 and 73 are introduced into the first reactor 71, the first product 76 is introduced in to the second reactor 71'. The second starting materials 72' and 73' are introduced into the second reactor 71', the second product 76' is discharged from the reactor, the separated polymer 77' to be recycled is pulverized in the chopper 74' equipped with a high speed rotating means 75' and recycled to the first reactor 71. The unrecycled polymer 78' in the second reactor is collected.

Although not showed in the drawings, a plural number of reactors can be connected in parallel in the present invention.

In the two reactors systems as shown in FIGS. 5–8, it is preferable to employ a twin axis reactor as the first reactor because of high viscosity therein and to employ a mono-axis reactor as the second reactor so as to polymerize the solid state polymer from the first reactor at a high speed of rotation. However, depending on the polymerization condition, the twin axis reactor and mono-axis reactor can be properly combined, which will be easily conducted by an ordinary skilled person in the art.

It is preferable to maintain the polymerization temperature in the first and second reactors at 0~140° C., more preferably at 30~100° C. The temperature can be controlled with heating media that are filled in the reactors.

The separated polymer to be recycled contains usually a certain amount of unreacted monomers. Therefore the unreacted monomers should be removed before being recycled. The unreacted monomers can be removed by drying the separated polymers in a drier (not shown in the drawings). After the unreacted monomers are removed from the separated polymer, the polymer is recycled with/without pulverizing. The drier may be a batch type or a continuous type, which is designed to operate under reduced pressure or high pressure. The drier has the same structure as the mono-axis reactor of self-cleaning type, separating effectively the unreacted monomers from the polymer by operating in a high speed of rotation.

The syndiotactic styrenic polymer collected in the present invention is heat-melted in a pelletizer (not shown in the drawings), extruded as the form of strands, and palletized by cutting. The pellets of syndiotactic styrenic polymer may be pulverized into a fine powder state so that the powder might be recycled to the reactor to polymerize with the styrenic monomers.

Polymerization Reactor

For preparation of styrenic homopolymer or copolymer in the present invention, it is preferable to use a horizontal type self-cleaning reactor which is designed to agitate the reactants well therein and to transport the reactants and/or products. Either a batch type or a continuous type can be used. More preferably, a plug-flow reactor can be used. The reactor for use in the present invention is a mono-axis type or a twin axis type. The temperature of the reactor can be controlled with heating media that are filled into the jacket installed around the axis.

A representative mono-axis reactor for preparing styrenic polymers in the present invention is equipped with a plural number of protruded sheets along the axis at a regular distance. The sheets function to prevent agglomeration of the polymers on the inner wall of the reactor by rotating along with the axis at a certain clearance with the inner wall. Also, the reactor is equipped with a plural number of scrapers which are attached to the inner wall. The scrapers prevent agglomeration of the polymers by scraping the agglomerated polymers on the axis and protruded sheets while the axis and protruded sheets rotate. Another representative mono-axis reactor is equipped with a plural number of protruded saw-toothed disks along the axis in regular instead of protruded sheets. The saw-toothed disks or sheets remove the agglomerated polymers on the inner wall and disperse them by rotating along with the axis so as to increase the conversion rate of monomers to polymers. The reactants are introduced through an inlet at the entrance part of a reactor and the reactants and products are transported to an outlet at the opposite part during polymerization.

In the twin axis reactor usable in the present invention, the two axes may rotate in the same direction or in the opposite direction. Each axis has a plural number of disks with one or more paddles. The disks and paddles function to prevent agglomeration of the polymer on the inner wall of the reactor and formation of unflowable bands of the polymer between the inner wall and the agitating blades. The disks and paddles can be easily understood and modified by an ordinary skilled person in the art.

A representative cylindrical type reactor is equipped with a plural number of arms which are installed along the axis at a regular distance. The arms may be attached with agitating means such as a plow. The arms are installed at a certain clearance with the inner wall to provide a good agitating effect. Alternatively, a pulverizing means such as a chopper can be installed between the arms. Using the cylindrical type reactor, the solid or powder state polymer is rotated along the axis and moved toward the outlet of the reactor, a liquid phase powder bed polymerization being realized.

Syrenic Monomer

The styrenic monomer used in this invention is represented by the following formula (A) or (B):

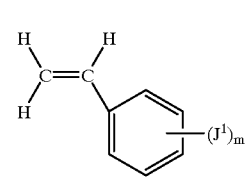

(A)

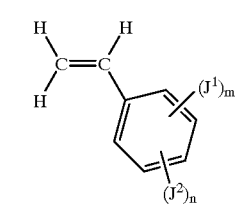

(B)

In formula (A), $J^1$ is a hydrogen; a halogen; or a substituting group containing at least one of carbon, oxygen, silicon, phosphor, sulfur, selenium and tin, m is 1, 2 or 3. If m is 2 or 3, $J^1$s may be different each other.

In formula (B), $J^1$ is a hydrogen; a halogen; a substituting group containing at least one of carbon, oxygen, silicon, phosphor, sulfur, selenium and tin, $J^2$ is a substituting group of $C_{2-10}$ having at least one unsaturated bond, m is 1, 2 or 3, n is 1 or 2. If m is 2 or 3, $J^1$s may be different each other. If n is 2, $J^2$s may be different each other.

The representative examples of formula (A) are alkylstyrene, halogenated styrene, halogen-substituted alkylstyrene, alkoxystyrene, vinylbiphenyl, vinylphenylnaphthalene, vinylphenylanthracene, vinylphenylpyrene, trialkylsilylvinylbiphenyl, trialkylstyrenicbiphenyl, alkylsilylstyrene, carboxymethylstyrene, alkylesterstyrene, vinylbenzenesulphonic acid ester, and vinylbenzyldialkoxyphosphide.

The representative examples of alkylstyrene are styrene, methylstyrene, ethylstyrene, butylstyrene, p-methylstyrene, p-tert-butylstyrene, and dimethylstyrene; those of halogenated styrene are chlorostyrene, bromostyrene, and fluorostyrene; those of halogen-substituted alkylstyrene are chloromethylstyrene, bromomethylstyrene, and fluoromethylstyrene; those of alkoxystyrene are methoxystyrene, ethoxystyrene, and butoxystyrene; those of vinylbiphenyl are 4-vinylbiphenyl, 3-vinylbiphenyl, and 2-vinylbiphenyl; those of vinylphenylnaphthalene are 1-(4-vinylbiphenylnaphthalene), 2-(4-vinylbiphenylnaphthalene), 1-(3-vinylbiphenylnaphthalene), 2-(3-vinylbiphenylnaphthalene), and 1-(2-vinylbiphenylnaphthalene); those of vinylphenylanthracene are 1-(4-vinylphenyl)anthracene, 2-(4-vinylphenyl)anthracene, 9-(4-vinylphenyl)anthracene, 1-(3-vinylphenyl)anthracene, 9-(3-vinylphenyl)anthracene, and 1-(4-vinylphenyl)anthracene; those of vinylphenylpyrene are 1-(4-vinylphenyl)pyrene, 2-(4-vinylphenyl)pyrene, 1-(3-vinylphenyl)pyrene, 2-(3-vinylphenyl)pyrene, 1-(2-vinylphenyl)pyrene, and 2-(2-vinylphenyl)pyrene; that of trialkylsilylvinylbiphenyl is 4-vinyl-4-trimethylsilylbiphenyl; and those of alkylsilylstyrene are p-trimethylsilylstyrene, m-trimethylsilylstyrene, o-trimethylsilylstyrene, p-triethylsilylstyrene, m-triethylsilylstyrene, and o-triethylsilylstyrene.

The representative examples of the general formula (B) are divinylbenzene such as p-divinylbenzene and m-divinylbenzene, trivinylbenzene, and arylstyrene such as p-arylstyrene and m-arylstyrene.

Catalysts

A conventional catalyst for preparing polystyrene having high syndiotacticity can be employed in the present invention, but are not limited particularly. In general, metallocene catalysts consisting of a transition metal compound of Groups IV, V and VI of the Periodic Table can be used. Preferably, a titanium, zirconium or hafnium compound of Group IV can be used in the metallocene catalysts. The metallocene catalysts are prepared by reacting a half metallocene compound having an ancillary ligand with a compound having at least two activating groups such as hydroxy group, thiol group, primary amine group and secondary amine group. The catalysts are disclosed in U.S. Ser. Nos. 08/844,109 and 08/844,110 in detail. The catalysts may be supported on a supporter such as silica, alumina, magnesium chloride, zeolite, aluminum phosphorous, zirconia etc.

Cocatalysts

In the present invention, the metallocene catalyst is used with a cocatalyst. The cocatalyst is an organometallic compound such as alkyl aluminoxane and alkyl aluminum compound, or a compound of a non-coordinated Lewis acid and an alkyl aluminum, which are known to an ordinary skilled person in the art. The representative examples of alkyl aluminoxane are methyl aluminoxane (MAO), modified methyl aluminoxane (MMAO), silica supported methyl aluminoxane and silica supported and modified methyl aluminoxane. The alkyl aluminoxane includes an alkyl aluminoxane having a repeating unit of the following formula (C). The alkyl aluminoxane is divided into a linear alkyl aluminoxane represented by the following formula (D) and a cyclic alkyl aluminoxane represented by the following formula (E):

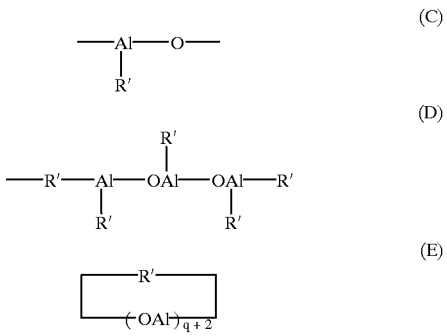

wherein $R^1$ is an alkyl group of $C_{1-6}$ and q is an integer of 0~100.

The examples of alkyl aluminum compound usable as a cocatalyst in this invention are trimethyl aluminium, triethyl aluminium, dimethyl aluminium chloride, diethyl aluminium chloride, triisobutyl aluminium, diisobutylaluminium chloride, tri(n-butyl)aluminium, tri(n-propyl) aluminium and triisopropyl aluminium. Triisobutyl aluminum can be preferably used.

The molar ratio of alkyl aluminum to transition metal of Group IV of a metallocene catalyst is from 1:1 to 10000:1, preferably from 10:1 to 5000:1, more preferably from 10:1 to 1000:1.

Where a compound of a non-coordinated Lewis acid and an alkyl aluminum is used a cocatalyst, the molar ratio of the aluminum of the cocatalyst to the transition metal of metallocene catalyst is from 1:1 to $1 \times 10^6$:1, preferably from 1:1 to $1 \times 10^4$:1.

Inert Organic Solvent

In the present invention, an inert organic solvent can be added to the monomer mixture. Of course, the polymerization of this invention can be proceeded without solvent. Hexane, heptane, kerosene, decane, benzene, toluene, xylene and chlorobenzene are preferably used as inert organic solvent, more preferably an aromatic solvent such as benzene, toluene and xylene may be used. The volume ratio of the inert organic solvent to styrenic monomer is in the range of 0~0.99:1, preferably 0~0.5:1, and more preferably 0~0.2:1.

The present invention will be described in more detail by the following Examples. The Examples are given only to illustrate the present invention and not intended in any way to limit the scope of the invention.

EXAMPLES

Example 1

Preparation of Styrene Homopolymer

A reactor of 3 liter volume autoclave U-shape was used for preparing styrene homopolymer, which is a mono-axis type having a diameter of 160 mm and is equipped with five disks each of which has two paddles. The reaction temperature was controlled by feeding heating media into the jacket and axis. The reactor was kept at 70° C., to the reactor was 3 kg of well-purified syndiotactic styrenic polymer added, and the reactor was agitated at a speed of 80 rpm. To the reactor were a mixture of 2000 cc of styrene monomer and triisobutyl aluminum containing 160 mmol of aluminum, modified methyl aluminoxane containing 20 mmol of aluminum, and metallocene catalyst containing 400 mol of titanium added for two hours. The prepared polymer of 1 kg was discharged from the reactor under nitrogen atmosphere, agitated at a speed of 2000 rpm for 30 minutes and recycled to the reactor. The polymerization reaction was carried out again for another one hour and and terminated by adding a small amount of methyl alcohol. The resulting product was washed with an excess amount of methyl alcohol containing hydrogen chloride and filtered. The product of styrene homopolymer was not agglomerated on the inner wall of the reactor. The conversion rate to styrene homopolymer was 64%, the molecular weight was 480000 and the molecular weight distribution was 2.2. The average particle size of the obtained polymer was as fine as 100 microns and the bulk density (BD) as high as 0.47.

Example 2

Preparation of Ethylene/Styrene Copolymer

The polymerization process was conducted in the same manner as in Example 1 except adding 3 kg of well-purified ethylene/styrene copolymer, and further adding 4 kg/cm$^2$ of ethylene. The polymerization reaction was terminated by adding a small amount of methyl alcohol. The resulting product was treated with an excess amount of methyl alcohol containing hydrogen chloride and washed with water and methyl alcohol and vacuum-dried for several hours. The obtained copolymer was melt in boiling THF. The solution contains 62 mol % of styrene, and shows melting points at 84° C., 241° C. and 264° C. It is known that the chemical structure of ethylene/styrene copolymer is determined using $^{13}$C-NMR. The peaks at 41.83, 44.08, 45.2 and 145.79 ppm show that adjacent styrene repeating units are syndiotactic and, in particular, the peaks at 41.83, 45.2 and 145.79 ppm from the SSS sequence show syndiotactic styrene homopolymer. The dissolved portion of the copolymer in boiling THF shows the peaks characterized by the syndiotactic copolymer. In this Example, agglomeration of the copolymer was drastically reduced in the inner wall of the reactor compared with the conventional process that a portion of the product was not recycled.

Comparative Example

This Comparative Example was conducted in the same manner as in Example 1 except using a reactor with dual spiral blades of a diameter of 104 mm and of a distance of 5 mm and not recycling a portion of the product. The reactor was kept at 70° C., to the reactor was 3 kg of well-purified syndiotactic styrene polymer added, and the reactor was agitated at a speed of 80 rpm. To the reactor were a mixture of 200 cc of styrene monomer and triisobutyl aluminum containing 36 mmol of aluminum, modified methyl aluminoxane containing 4.5 mmol of aluminum, and metallocene catalyst containing 45 mol of titanium added for twenty minutes. The prepared polymer was agitated at a speed of 400 rpm for two hours. The polymerization reaction was terminated by adding a small amount of methyl alcohol. The resulting product was washed with an excess amount of methyl alcohol containing hydrogen chloride and filtered. The product of styrene homopolymer was agglomerated on the inner wall of the reactor. The conversion rate to styrene homopolymer was 62%, the molecular weight was 369000 and the molecular weight distribution was 2.3. The particle size of the obtained polymer is not uniform and the bulk density (BD) is 0.31.

As shown in Examples 1–2, the process for preparing syndiotactic styrenic polymer according to the present invention does not occur agglomeration of the product on the inner wall of the reactor and can prepare polystyrene with high syndiotactic stereoregularity and high bulk density.

In the above, the present invention was described based on the preferred embodiment of the present invention, but it should be apparent to those ordinarily skilled in the art that various changes and modifications can be added without departing from the spirit and scope of the present invention. Such changes modifications should come within the scope of the present invention.

What is claimed is:

1. A polymerization process for preparing a syndiotactic styrenic polymer with a high conversion rate in the form of powder, which comprises:
    (a) preparing styrenic polymers in a solid state by reacting a mixture consisting of styrenic monomers, a metallocene catalyst, a cocatalyst and an inert organic solvent in a polymerization reactor;
    (b) separating a portion of the styrenic polymers from the reactor;
    (c) recycling the separated portion of the styrenic polymers in the reactor; and
    (d) reacting the recycled styrenic polymers with styrenic monomers.

2. The polymerization process of claim 1 further comprising, prior to conducting step (c), a step of pulverizing the separated portion of the styrenic polymers.

3. The polymerization process of claim 1 wherein said conversion rate is about 60% or more.

4. The polymerization process of claim 1 wherein said polymerization reactor is arranged with a plural number of reactors in series.

5. The polymerization process of claim 1 wherein said polymerization reactor is arranged with a plural number of reactors in parallel.

6. The polymerization process of claim 1 wherein said polymerization reactor is a self-cleaning mono- or twin-axis reactor.

7. The polymerization process of claim 1 wherein said polymerization reactor is a cylindrical reactor in which the styrenic polymers are transported in a solid or powder state rotating in a certain direction at the range of Froude Number of from 0.1 to 10 and polymerization proceeds toward the exit of the reactor.

8. The polymerization process of claim 1 wherein said polymerization reactor is equipped with multiple inlets.

9. The polymerization process of claim 4 wherein said plural number of reactors comprises:
    a first reactor to which the first starting materials are introduced, the first product is discharged from the first reactor, a portion of the first product is separated, and the separated polymer is recycled to the first reactor; and
    a second reactor to which the unrecycled polymer is introduced from the first reactor, the second starting materials are introduced, the second product is discharged from the second reactor, a portion of the second product is separated, the separated polymer is recycled to the second reactor, and the unrecycled polymer from the second reactor is collected.

10. The polymerization process of claim 4 wherein said plural number of reactors comprises:

a first reactor to which the first starting materials are introduced, and the first product is discharged to a second reactor; and the second reactor to which the unrecycled polymer is introduced from the first reactor, the second starting materials are introduced, the second product is discharged from the second reactor, a portion of the second product is separated, the separated polymer is recycled to the first reactor, and the unrecycled polymer from the second reactor is collected.

11. The polymerization process of claim 1 wherein said styrenic monomers includes olefinic monomers.

12. The polymerization process of claim 1 wherein said styrenic monomers are represented by the following formula (A) or (B):

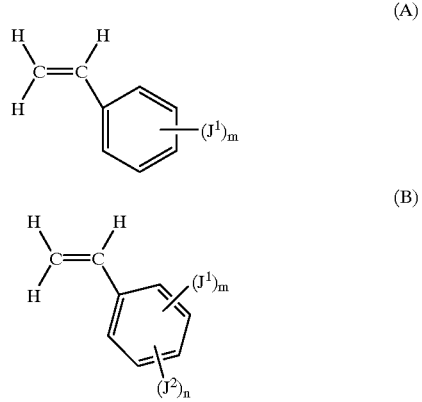

in formula (A), $J^1$ is a hydrogen; a halogen; or a substituting group containing at least one of carbon, oxygen, silicon, phosphor, sulfur, selenium and tin, m is 1, 2 or 3, if m is 2 or 3, $J^1$s may be different each other; and in formula (B), $J^1$ is a hydrogen; a halogen; a substituting group containing at least one of carbon, oxygen, silicon, phosphor, sulfur, selenium and tin, $J^2$ is a substituting group of $C_{2-10}$ having at least one unsaturated bond, m is 1, 2 or 3, n is 1 or 2. if m is 2 or 3, $J^1$s may be different each other, if n is 2, $J^2$s may be different each other.

13. The polymerization process of claim 12 wherein said styrenic monomers of formula (A) are selected from the group consisting of alkylstyrene, halogenated styrene, halogen-substituted alkylstyrene, alkoxystyrene, vinylbiphenyl, vinylphenylnaphthalene, vinylphenylanthracene, vinylphenylpyrene, trialkylsilylvinylbiphenyl, trialkylstyrenicbiphenyl, alkylsilylstyrene, carboxymethylstyrene, alkylesterstyrene, vinylbenzenesulphonic acid ester, and vinylbenzyldialkoxyphosphide, and said styrenic monomers of formula (B) are selected from the group consisting of p-divinylbenzene, m-divinylbenzene, trivinylbenzene, p-arylstyrene and m-arylstyrene.

14. The polymerization process of claim 1 wherein said metallocene catalyst is prepared by reacting a half metallocene compound having an ancillary ligand with a compound having at least two activating groups selected from the group consisting of a hydroxy group, a thiol group, a primary amine group and a secondary amine group.

15. The polymerization process of claim 14 wherein said metallocene catalyst is supported on a supporter selected from the group consisting of silica, alumina, magnesium chloride, zeolite, aluminum phosphorous, and zirconia.

16. The polymerization process of claim 1 wherein said inert organic solvent is selected from the group consisting of hexane, heptane, kerosene, decane, benzene, toluene, xylene and chlorobenzene.

17. The polymerization process of claim 1 wherein the volume ratio of said inert organic solvent to said styrenic monomers is in the range of 0~0.99:1.

18. The polymerization process of claim 1 wherein said cocatalyst is selected from the group consisting of an alkyl aluminoxane, an alkyl aluminum compound, and a compound of a non-coordinated Lewis acid and an alkyl aluminum.

19. The polymerization process of claim 18 wherein said alkyl aluminoxane is selected from the group consisting of a methyl aluminoxane (MAO), a modified methyl aluminoxane (MMAO), a silica supported methyl aluminoxane and a silica supported and modified methyl aluminoxane.

20. The polymerization process of claim 18 wherein the metallocene catalyst comprises a transition metal compound of Group IV of the periodic table.

21. The polymerization process of claim 20 wherein the molar ratio of said alkyl aluminum compound to the transition metal of Group IV of said metallocene catalyst is from 1:1 to 10000:1.

22. The polymerization process of claim 20 wherein the molar ratio of the aluminum of said cocatalyst to the transition metal of said metallocene catalyst is from 1:1 to $1 \times 10^6$.

* * * * *

UNITED STATES PATENT AND TRADEMARK OFFICE
CERTIFICATE OF CORRECTION

| | | |
|---|---|---|
| PATENT NO. | : 6,369,173 B1 | Page 1 of 1 |
| DATED | : April 9, 2002 | |
| INVENTOR(S) | : Young-Sub Lee, Hyun-Hoon Kim, Jae-Gon Lim and Sung-Cheol Yoon | |

It is certified that error appears in the above-identified patent and that said Letters Patent is hereby corrected as shown below:

<u>Title page,</u>
Item [75], Inventors, insert -- Young-Sub Lee, of Taejeon -- before "Hyun-Hoon Kim"

Signed and Sealed this

Twenty-ninth Day of October, 2002

Attest:

Attesting Officer

JAMES E. ROGAN
*Director of the United States Patent and Trademark Office*